US007018295B2

(12) United States Patent
Sakaguchi et al.

(10) Patent No.: US 7,018,295 B2
(45) Date of Patent: Mar. 28, 2006

(54) ONLINE-COMPOSITE SERVICING METHOD, RECORDING MEDIUM RECORDED WITH PROGRAMS FOR REALIZING THE METHOD, AND ONLINE-COMPOSITE SERVICING SYSTEM

(75) Inventors: Hironobu Sakaguchi, Tokyo (JP); Ken Narita, Tokyo (JP); Keizo Kokubo, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 518 days.

(21) Appl. No.: 09/764,409

(22) Filed: Jan. 19, 2001

(65) Prior Publication Data

US 2001/0009868 A1 Jul. 26, 2001

(30) Foreign Application Priority Data

Jan. 20, 2000 (JP) ............................ 2000-012315
Jan. 12, 2001 (JP) ............................ 2001-005452

(51) Int. Cl.
*A63F 13/00* (2006.01)

(52) U.S. Cl. ............................ 463/42; 463/29; 463/43

(58) Field of Classification Search ............ 463/40–43, 463/1, 25, 29; 434/322

See application file for complete search history.

(56) References Cited

U.S. PATENT DOCUMENTS 4,987,492 A * 1/1991 Stults et al. ............. 348/14.08
5,107,443 A * 4/1992 Smith et al. ................ 345/751

(Continued)

FOREIGN PATENT DOCUMENTS

JP 10-52571 2/1998

OTHER PUBLICATIONS

Instant Messaging Guide. Article [online]. Viewz.com, 1998 [retrieved on Aug. 1, 2002]. Retrieved from the Internet: <URL:www.viewz.com/features.imprint.htm>.*

(Continued)

*Primary Examiner*—John M. Hotaling, II
(74) *Attorney, Agent, or Firm*—Greenblum & Bernstein, P.L.C.

(57) ABSTRACT

To make it possible to provide other services even at the time of executing an online game and to communicate with a player receiving the other services in an online game space.

Each game terminal receives comics distributions from a comics server and music distributions from a music server, even while executing the online game over its own browser. The game server administers the game participation of each game terminal and the utilization of various services (e.g., comics distributions, music distributions, mails or chats) by using a service utilization database. The game players can communicate with each other in the game space by the knock function in accordance with the service utilizations under the control of the game server.

27 Claims, 10 Drawing Sheets

21

| IDENTIFICATION INFORMATIONS | GAME PARTICIPATION | POSITIONAL INFORMATION (MAP NO.) | SERVICES BEING ENJOYED | | | |
|---|---|---|---|---|---|---|
| | | | COMICS | MUSIC | MAIL | CHAT |
| AAAA | ○ | 6 | ○ | - | - | - |
| BBBB | ○ | 6 | - | - | - | - |
| CCCC | ○ | 7 | - | - | - | - |
| DDDD | - | - | - | ○ | - | - |
| ⋮ | ⋮ | ⋮ | ⋮ | ⋮ | ⋮ | ⋮ |

U.S. PATENT DOCUMENTS

| | | | | |
|---|---|---|---|---|
| 5,774,668 | A * | 6/1998 | Choquier et al. | 709/223 |
| 5,793,365 | A * | 8/1998 | Tang et al. | 345/758 |
| 5,835,087 | A * | 11/1998 | Herz et al. | 345/810 |
| 5,848,134 | A * | 12/1998 | Sekiguchi et al. | 379/93.15 |
| 5,880,731 | A * | 3/1999 | Liles et al. | 345/758 |
| 5,956,485 | A * | 9/1999 | Perlman | 709/204 |
| 5,960,173 | A * | 9/1999 | Tang et al. | 709/201 |
| 6,352,479 | B1 * | 3/2002 | Sparks, II | 463/42 |
| 6,434,599 | B1 * | 8/2002 | Porter | 709/204 |
| 6,449,344 | B1 * | 9/2002 | Goldfinger et al. | 379/88.17 |
| 6,577,328 | B1 * | 6/2003 | Matsuda et al. | 345/757 |
| 6,677,968 | B1 * | 1/2004 | Appelman | 345/853 |

OTHER PUBLICATIONS

Ultima Online Playguide. Instruction Manual [online]. Origin Systems, Inc., 1999 [retrieved on Feb. 27, 2003]. Retrieved from the Internet: <URL: guide.uo.com>.*

English Language Abstract of JP 10-52571.

English Language Abstract of JP 10-52571.

* cited by examiner

FIG. 2

21

| IDENTIFICATION INFORMATIONS | GAME PARTICIPATION | POSITIONAL INFORMATION (MAP NO.) | SERVICES BEING ENJOYED | | | |
|---|---|---|---|---|---|---|
| | | | COMICS | MUSIC | MAIL | CHAT |
| AAAA | ○ | 6 | ○ | – | – | – |
| BBBB | ○ | 6 | – | – | – | – |
| CCCC | ○ | 7 | – | – | – | – |
| DDDD | – | – | – | ○ | – | – |
| ⋮ | ⋮ | ⋮ | ⋮ | ⋮ | ⋮ | ⋮ |

* DISPLAY MODE RECEIVING MUSIC SERVICE

ONLINE-COMPOSITE SERVICING METHOD, RECORDING MEDIUM RECORDED WITH PROGRAMS FOR REALIZING THE METHOD, AND ONLINE-COMPOSITE SERVICING SYSTEM

BACKGROUND OF THE INVENTION

1. Field of the Invention

The present disclosure relates to subject matter contained in Japanese Patent Application No. 2000-012315, filed on Jan. 20, 2000, and Japanese Patent Application No. 2001-005452, filed on Jan. 12, 2001, the disclosures of which are expressly incorporated herein by reference in their entirety.

The present invention relates to an online-composite servicing method for providing other services concurrently with the execution of an online game, a recording medium recorded with a program for realizing the method, and an online-composite servicing system.

2. Related Art

A role playing game, or an online game, progresses with time approximate to the real time. In this case, the user playing a displayed player advances the game as it is to a next event. While the game is progressing, the user playing a displayed player can naturally leave the computer to read or listen to, for example, music.

There already exists a technique for executing a plurality of applications concurrently but independently, as in Windows (i.e., the registered Trade Mark of Microsoft). In this case, it is easily realized to listen to the music or read on the computer screen concurrently with the execution of the game.

Here, the user intends mainly to play the online game, and the situation without an event is frequently compensated by other tastes. It is, therefore, desirable that even the listening or reading user can return to continue the game instantly if the event occurs.

In the online games of today, the services for chats in the game have been available, but it has not been realized yet to support the services for reading or listening to the musical contents.

Even if the other services (e.g., listening to the musical contents or the reading) concurrent with the play of the online game can be realized, the online game space is continued. It is, therefore, expected to provide an environment where the user playing a displayed player is not disconnected from another user playing a displayed player in the game space.

SUMMARY OF THE INVENTION

An object of the invention is to provide an online-composite servicing method capable of providing other services concurrently with the execution of an online game, a recording medium recorded with a program for realizing the method, and an online-composite servicing system.

Another object of the invention is to provide an online-composite servicing method capable of providing communications with a user playing a displayed player receiving other services in an online game space, a recording medium recorded with a program for realizing the method, and an online-composite servicing system.

In order to solve the aforementioned problems and to achieve the above-specified objects, according to a first aspect of the invention, there is provided an online-composite servicing method for controlling communications between a game server and a game terminal through a network, comprising under the control of said game server, assigning identification information individually to said game terminal and administering the game space positional information of a displayed player of said game terminal, as participating in the game, individually with the identification information; discriminating those of said game terminal participating in the game which are receiving other services concurrently through the network, with a notice from said game terminal; adding, where there is said discriminated game terminal, information specifying said other services to the game space positional information of the displayed player of said game terminal; and feeding said game terminal participating in the game, with said administered game space positional information of the displayed player and the information specifying said other services, and under the control of said game terminal, displaying the service utilization of another user playing a displayed player on the basis of the game space positional information of the another displayed player, as fed from said game server, and the information specifying the other services; accepting a demand for other services in response to the operation of the user playing a displayed player participating in the game; and receiving, when the demand for said other services is accepted, said other services through said network while executing the game on the background, and informing said game server of that said other services are being received.

According to this first aspect, the online-composite servicing method may further comprise under the control of said game terminal, accepting the identification information specifying the another user playing a displayed player in response to the operation of the user playing a displayed player when a knock is made in the game space to the another user playing a displayed player, and transmitting said accepted identification information and the identification information of its own game terminal as the identification information of the knocked game terminal and the identification information of the knocking game terminal to said game server, respectively, for demanding the knock, under the control of said game server, making a knock to said knocked game terminal, when said knock demand is received, and informing the identification information of said knocking game terminal.

In this case, the online-composite servicing method may further comprise under the control of said game server, controlling the message exchange between said knocked game terminal and said knocking game terminal where said knocked game terminal answers the knock; or under the control of said game server, controlling the chat communications between said knocked game terminal and said knocking game terminal where said knocked game terminal answers the knock.

Moreover, the online-composite servicing method may further comprise under the control of said game terminal, receiving the feed of musical data or comics data as other services. In this case, the online-composite servicing method may further comprise: under the control of said game terminal, changing said another displayed player into a display mode listening to a music or reading comics in the game space when it is confirmed from said information specifying the other services that said another user playing a displayed player is receiving the music services or the comics services.

According to a second aspect of the invention, on the other hand, there is provided a computer-readable recording medium stored with a program for realizing a method for controlling communications between a game server and a game terminal through a network, wherein said computer is programmed under the control of said game server, to assign identification information individually to said game terminal and to administer the game space positional information of a displayed player of said game terminal, as participating in the game, individually with the identification information; to discriminate those of said game terminal participating in the game which are receiving other services concurrently through the network, with a notice from said game terminal; to add, where there is said discriminated game terminal, information specifying said other services to the game space positional information of the displayed player of said game terminal; and to feed said game terminal participating in the game, with said administered game space positional information of the displayed player and the information specifying said other services, and under the control of said game terminal, to display the service utilization of another user playing a displayed player on the basis of the game space positional information of the another displayed player, as fed from said game server, and the information specifying the other services; to accept a demand for other services in response to the operation of the user playing a displayed player participating in the game; and to receive, when the demand for said other services is accepted, said other services through said network while executing the game on the background, and informing said game server of that said other services are being received.

According to this second aspect, said computer may be further programmed under the control of said game terminal, to accept the identification information specifying the another user playing a displayed player in response to the operation of the user playing a displayed player when a knock is made in the game space to the another displayed player, and to transmit said accepted identification information and the identification information of its own game terminal as the identification information of the knocked game terminal and the identification information of the knocking game terminal to said game server, respectively, for demanding the knock; and under the control of said game server, to make a knock to said knocked game terminal, when said knock demand is received, and to inform the identification information of said knocking game terminal.

In this case, said computer may be further programmed under the control of said game server, to control the message exchange between said knocked game terminal and said knocking game terminal where said knocked game terminal answers the knock; or under the control of said game server, to control the chat communications between said knocked game terminal and said knocking game terminal where said knocked game terminal answers the knock.

Moreover, said computer maybe further programmed under the control of said game terminal, to receive the feed of musical data or comics data as other services. In this case, said computer may be further programmed under the control of said game terminal, to change said another displayed player into a display mode listening to a music or reading comics in the game space when it is confirmed from said information specifying the other services that said another user playing a displayed player is receiving the music services or the comics services.

According to a third aspect of the invention, on the other hand, there is provided an online-composite servicing system for controlling communications between a game server and a game terminal through a network, wherein said game server comprises administration means for assigning identification information individually to said game terminal and for administering the game space positional information of a displayed player of said game terminal, as participating in the game, individually with the identification information; discrimination means for discriminating those of said game terminal participating in the game which are receiving other services concurrently through the network, with a notice from said game terminal; addition means for adding, where there is said discriminated game terminal, information specifying said other services to the game space positional information of the displayed player of said game terminal in said administration means; and feed means for feeding said game terminal participating in the game, with said administered game space positional information of the displayed player and the information specifying said other services, and wherein said game terminal comprises: display means for displaying the service utilization of another user playing a displayed player on the basis of the game space positional information of the another displayed player, as fed by said feed means from said game server, and the information specifying the other services; acceptance means for accepting a demand for other services in response to the operation of the user playing a displayed player participating in the game; and composite service means for receiving, when the demand for said other services is accepted by said acceptance means, said other services through said network while executing the game on the background, and for informing said game server of that said other services are being received.

According to the third aspect, said game terminal may further comprise acceptance means for accepting the identification information specifying the another displayed player in response to the operation of the user playing a displayed player when a knock is made in the game space to the another user playing a displayed player, and for transmitting said accepted identification information and the identification information of its own game terminal as the identification information of the knocked game terminal and the identification information of the knocking game terminal to said game server, respectively, for demanding the knock, and said game server may further comprise knock means for making a knock to said knocked game terminal, when said knock demand is received, and for informing the identification information of said knocking game terminal.

In this case, said game server may further comprise control means for controlling the message exchange between said knocked game terminal and said knocking game terminal where said knocked game terminal answers the knock, or said game server may further comprise control means for controlling the chat communications between said knocked game terminal and said knocking game terminal where said knocked game terminal answers the knock.

Moreover, said game terminal may further comprise reception means for receiving the feed of musical data or comics data as other services. In this case, said game terminal may further comprise change means for changing said another displayed player into a display mode listening to a music or reading comics in the game space when it is confirmed from said information specifying the other services that said another user playing a displayed player is receiving the music services or the comics services.

BRIEF DESCRIPTION OF THE DRAWINGS

FIG. 2 is a diagram tabulating one example of administered contents of a service utilization database in the embodiment of FIG. 1;

DESCRIPTION OF THE PREFERRED EMBODIMENT

One embodiment of the invention will be described in detail with reference to the accompanying drawings.

Figure 1:
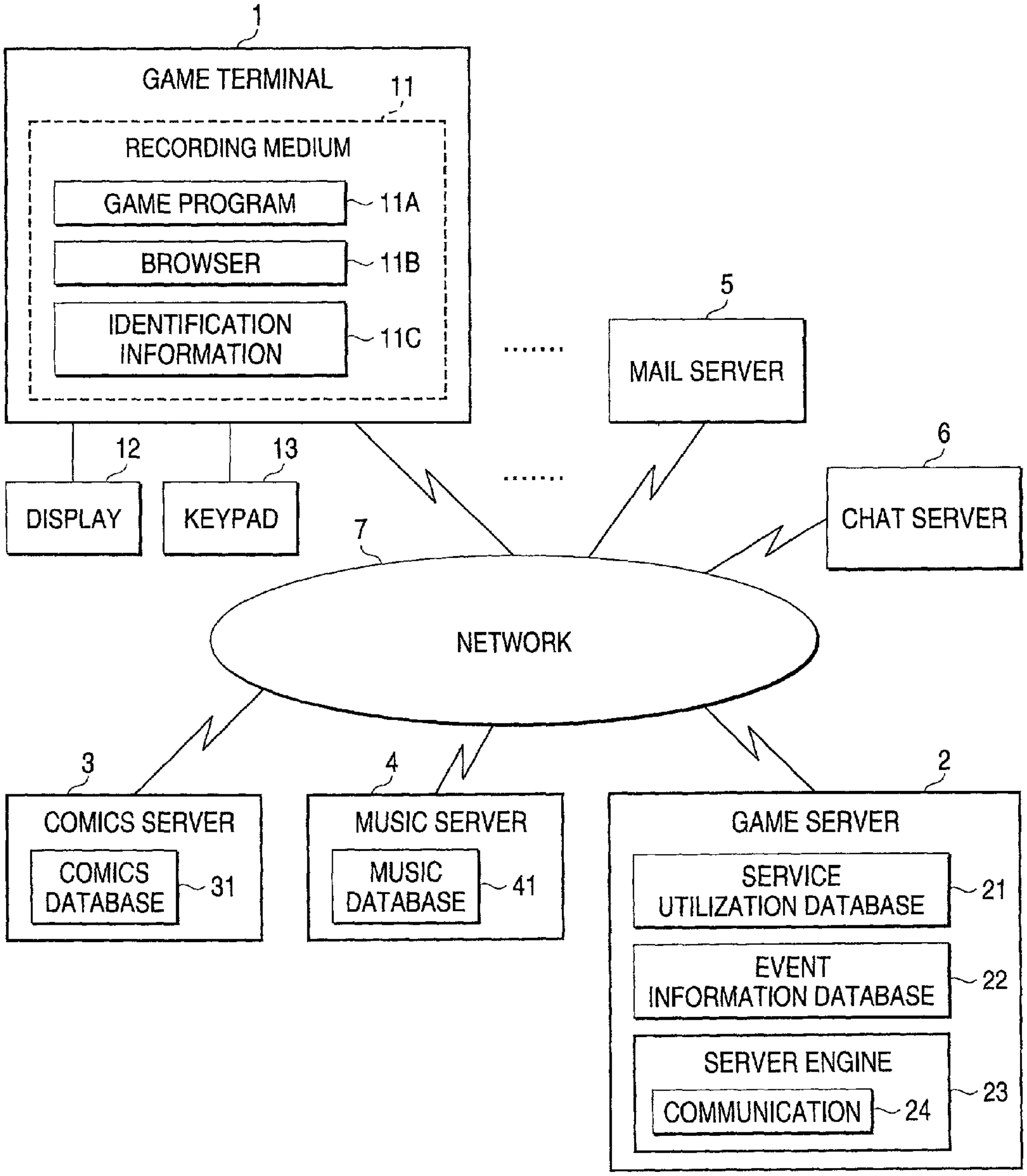
FIG. 1 is a block diagram for explaining an entire system according to one embodiment of the invention.

FIG. 1 is a block diagram for explaining an entire system according to one embodiment of the invention. This system performs communications through a network, as shown in FIG. 1, by connecting a game terminal 1, a game server 2, a comics server 3, a music server 4, a mail server 5, a chat server 6, and so on with that network.

To this system, on the other hand, there can be applied a technique such as the business network or the Internet. Where the business network or the Internet is to be applied to the system, there is needed an environment in which the services can be utilized after the authentication of a user was obtained by a dial-up from each game terminal 1 to the closest server. In the case of a connection with the network 7, this connection has to be made with the provider through a modem.

Here will be further described the individual devices. Each game terminal 1 is provided with a recording medium 11, in which there are recorded a game program 11A, a browser 11B, identification information 11C necessary for the user authentication, and so on. The recording medium 11 may be exemplified by a hard disk.

Here, the recording medium 11 may be fed with the game program 11A from a disk medium such as a CD-ROM, a DVD or a floppy disk. The game program 11A indicates an online dedicated game program or an offline dedicated game program. The browser 11B functions to control the screens, the communications, and so on, so that it can concurrently provide a plurality of services online.

Moreover, the identification information 11C is a user ID for identifying the user. This identification information 11C is utilized, when each service is received, for identifying a legal user. From this identification information 11C, on the other hand, it can be recognized on the game server side that a connection is made with the network.

The game terminal 1 is connected with a display 12 for displaying the image and outputting the sound for the client of each server, and a keypad 13 for the user to input the operations. The various services are provided through the display 12 and are controlled through the keypad 13.

As shown in FIG. 1, the game server 2 is provided with a service utilization database 21, an event information database 22, and a server engine 23 having a function to make communications between the users, and so on. The game server 2 is caused by the function of the server engine 23 to control the online game, thereby to provide the event information, as stored in the event information database 22, according to the game progress of each displayed player.

In the game server 2, the service utilization database 21 is a database for administering at real time the utilization of other services (e.g., comics, music, mail or chats) on the member of the online game provided. The utilization, as administered by the service utilization database 21, is referred to at the time of communications between the users.

The services informing whether or not the users are being connected to the network are already provided by the major business nets or the like, as exemplified by the techniques of the ICQ or the instant messaging. In this invention, it is possible to provide the environment, in which the service utilization between the users can be known on the game space, and to make a direct contact with a desired user playing a displayed player by a communication function 24. This function to make the direct contact will be called the "knock function".

The comics server 3 is provided with a comics database 31 or the like, as shown in FIG. 1. In the comics database 31, comics provided in series, such as weekly, monthly and extra editions, comics provided as separate volumes, and so on, are registered/updated as digital data. The comics server 3 distributes the comics data in response to a demand for the services from each game terminal 1.

The music server 4 is provided with a music database 32, as shown in FIG. 1. In the music database 32, songs are arranged into the latest hit numbers or different genres that the users can easily select, and are registered/updated as digital data. The music server 4 distributes the music data in response to a demand for the services from each game terminal 1.

The aforementioned distribution technique may resort to either streaming or downloaded data. On the other hand, it is necessary to apply the technique capable of ensuring the copy guard to the digital data to be distributed. In this case, it is necessary to incorporate an encryption technique at this stage to prevent the data from being copied to another recording medium.

Moreover, the mail server 5 controls the mail service which is to be provided when a demand is made from each game terminal 1 through the browser, as shown in FIG. 1. The chat server 6 controls the chat service which is to be provided when a demand is made from each game terminal 1 through the browser, as shown in FIG. 1. The chat server 6 also assists the communications between the displayed players (or users), as has been described hereinbefore, after the knock function was executed in the game space.

Thus, the individual services of games, comics, music, mail and chats are provided through the browser belonging to each game terminal 1.

The service utilization database 21 will now be described in greater detail. FIG. 2 is a diagram tabulating one example of administered contents of the service utilization database 21. The table shown in FIG. 2 stores different Identification Information with Game Participation, Positional Information (Map No.) in the game space and Services Being Enjoyed (Comics, Music, Mail and Chat), for each user playing a displayed player.

In FIG. 2, letters AAAA, BBBB, CCCC and DDDD indicate the identification information of the displayed players (or users). In order to differentiate the individual displayed players, the displayed players will be called with the identification information, such as displayed player AAAA or displayed player BBBB.

In view of the row of displayed player AAAA of the table of the service utilization database 21, it is seen that displayed player AAAA is participating in the game and is moving at a position of Map No. 6. It is further seen that the user playing a displayed player AAAA is concurrently receiving the comics services while playing the game. No other services are utilized.

On the other hand, it is seen that both the user playing displayed player BBBB and the user playing displayed player CCCC are participating in the game but do not utilize other services. It is seen that displayed player BBBB is moving at Map No. 6 and that displayed player CCCC is moving ahead of displayed player BBBB at Map No. 7.

Moreover, it is seen that the user playing displayed player DDDD does not participate in the game and that the positional information is unknown. It is seen that the user playing a displayed player DDDD is receiving the music services only.

Thus, each displayed player (or user) is administered on the participation in the game, the position in the game space and the utilization of other services by the identification information.

Figure 5A:
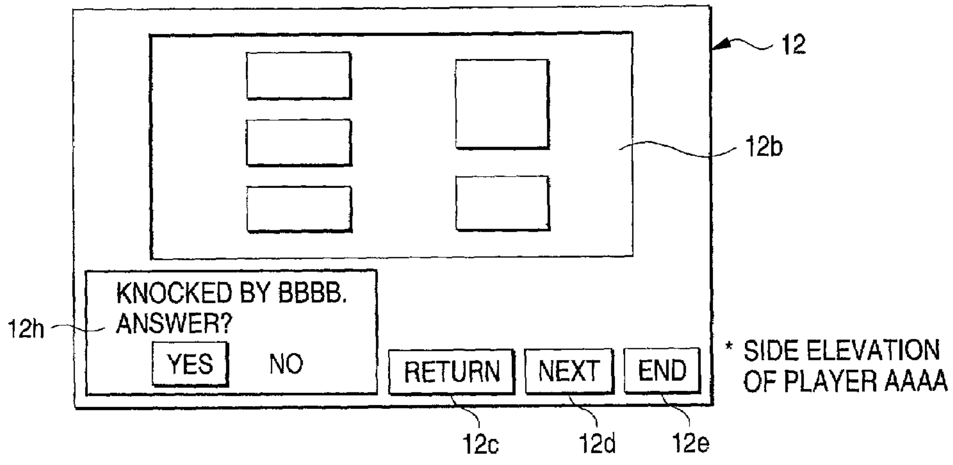
FIGS. 5A to 5C are diagrams showing an example of display transitions of an answer to the knocking action in the disclosed embodiment.
Figure 5B:
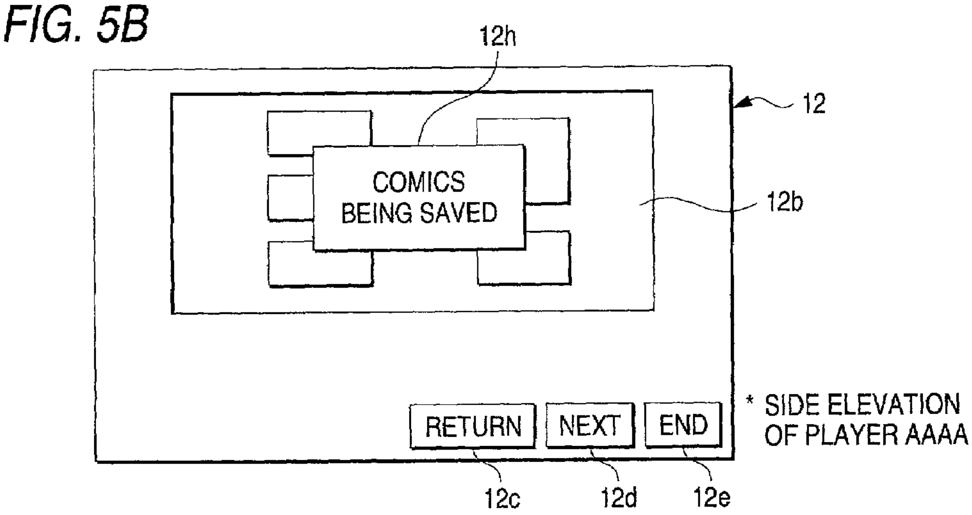
Figure 5C:
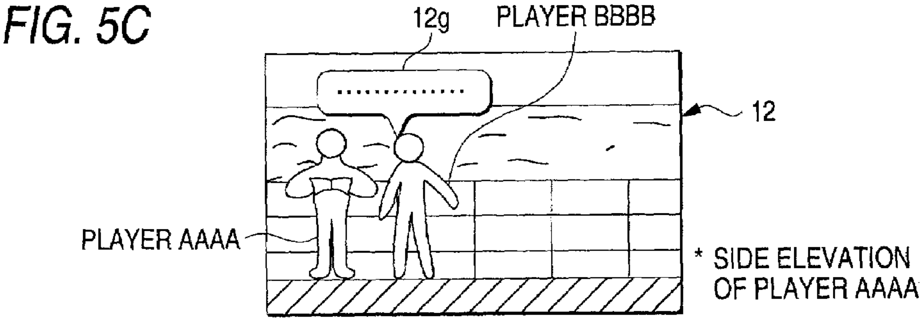
Figure 6A:
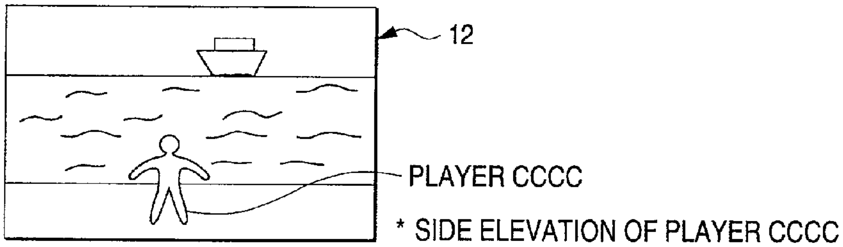
FIGS. 6A to 6C are diagrams showing another example of display transitions to the knocking action of the user playing a displayed player receiving the comics services concurrently with the games in the disclosed embodiment.
Figure 6B:
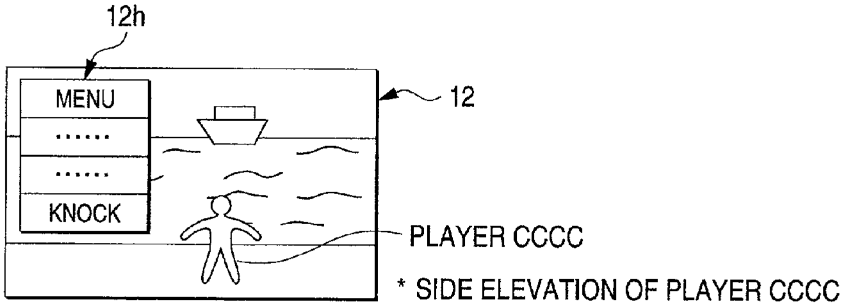
Figure 6C:
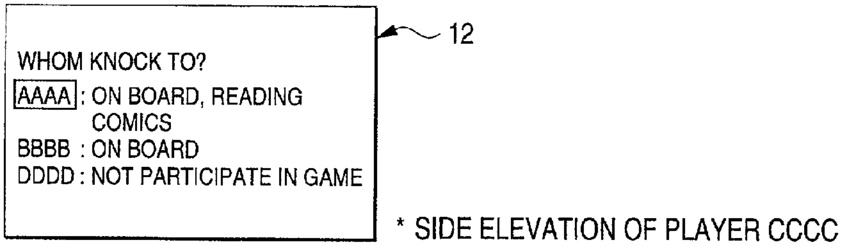
Figure 7:
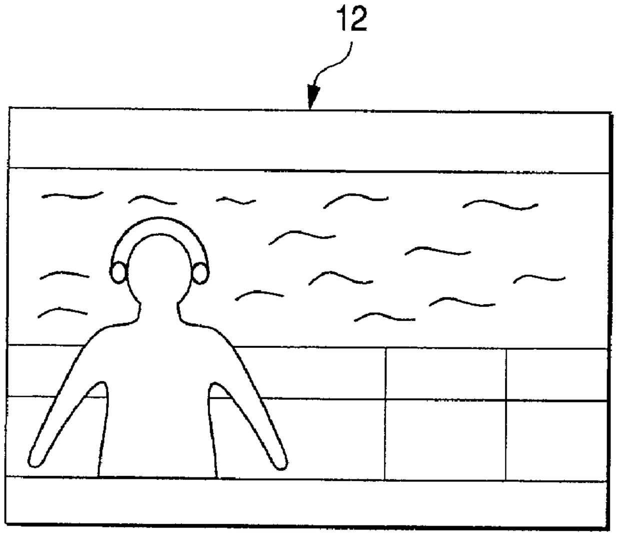
FIG. 7 is a diagram showing one display mode in which music services are received concurrently with the games in the disclosed embodiment.

Here will be described in detail the knock function in the game space. FIGS. 3A to 3E are diagrams showing an example of display transitions of the case in which comics services are received concurrently with the game; FIGS. 4A to 4D are diagrams showing an example of display transitions to a knocking action of the user playing a displayed player receiving the comics services concurrently with the game; FIGS. 5A to 5C are diagrams showing an example of display transitions of an answer to the knocking action; FIGS. 6A to 6C are diagrams showing another example of the display transitions to the knocking action of the user playing a displayed player receiving the comics services concurrently with the game; and FIG. 7 is a diagram showing one display mode in which the music services are received concurrently with the game.

With reference to FIGS. 3A–3E, here will be described the case in which the user playing a displayed player AAAA receives the comics services concurrently with the game. The user playing a displayed player AAAA is confronted with the scene to take a long course from a port (as referred to FIG. 3A). Then, the displayed player AAAA boards a ship (as referred to FIG. 3B). The user playing a displayed player AAAA thinks of receiving other services by utilizing the time on board.

Figure 3A:
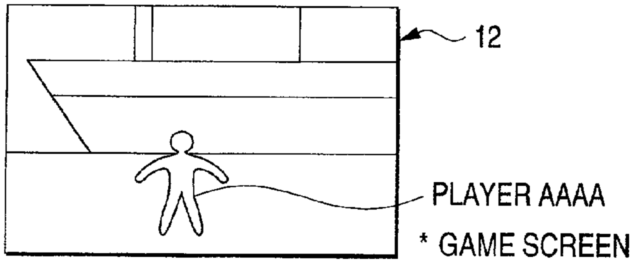
FIGS. 3A to 3E are diagrams showing an example of display transitions of the case in which comics services are received concurrently with games in the disclosed embodiment.
Figure 3B:
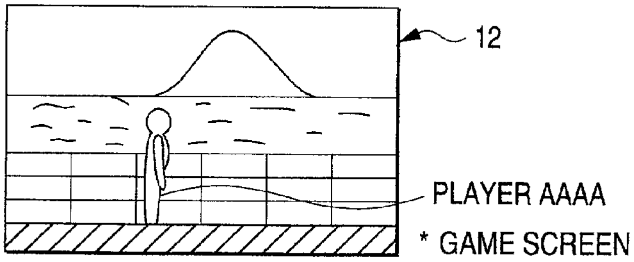
Figure 3C:
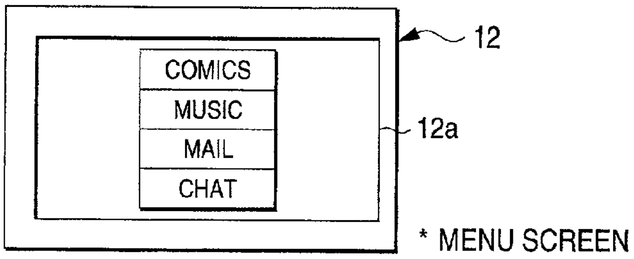
Figure 3D:
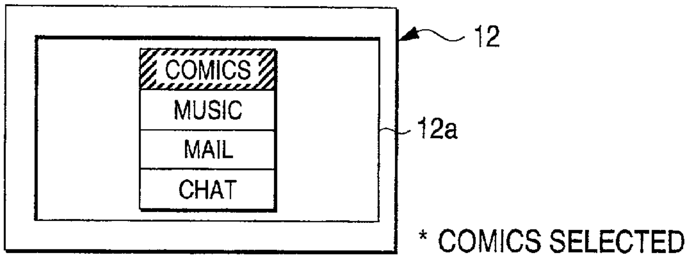

The user playing a displayed player AAAA operates the keypad 13 to display a menu screen 12*a* through the browser (as referred to FIG. 3C). When the comics services are selected by an additional operation (as referred to FIG. 3D), the game terminal 1 is connected with the comics server 3. When a desired comic is selected from the list serviced from the comics server 3, a comic picture of one page is displayed on a comic column 12*b* (as referred to FIG. 3E).

On the same screen, there are displayed icons of "Return" 12*c*, "Next" 12*d* and "End" 12*e* (as referred to FIG. 3E), one of which can be selected to return the page, to switch to the next page or to end the service.

By thus switching the game once to the background, it is possible to receive the comics services concurrently. Here, the service is returned to the game screen by operating the icon of "End" 12*e*.

Figure 3E:
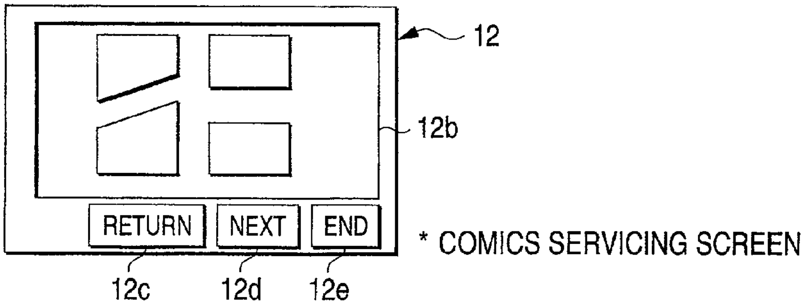

With reference to FIGS. 4A to 4D, here will be described the action for the user playing displayed player BBBB to knock the user playing displayed player AAAA receiving the comics services. The description will be started from the situation in which the user playing displayed player AAAA is receiving the comics services and in which displayed player BBBB is on board like displayed player AAAA, as shown in FIG. 3E. As tabulated in FIG. 2, both displayed player AAAA and displayed player BBBB are located at Map No. 6 (on board), and one user playing displayed player AAAA is receiving the comics services concurrently with the game services.

Figure 4A:
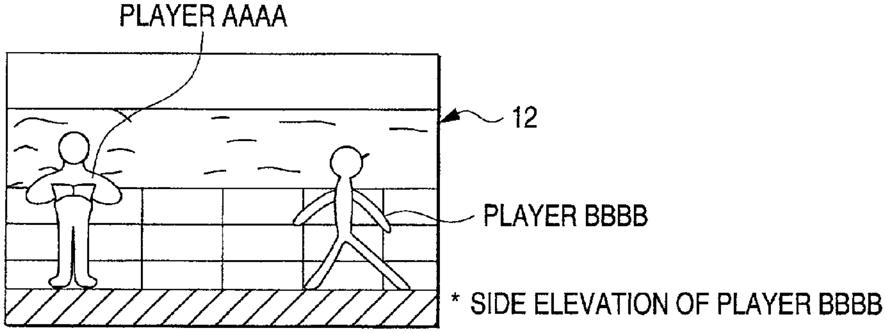
FIGS. 4A to 4D are diagrams showing an example of display transitions to a knocking action of a user playing a displayed player receiving the comics services concurrently with the games in the disclosed embodiment.

The user playing a displayed player AAAA is reading the comics on the deck so that the remaining users other than the user playing a displayed player AAAA can confirm it from the display mode corresponding to the comics services, in which displayed player AAAA is taking the pose of reading the comics (as referred to FIG. 4A). The interchange in this display mode is controlled by the service utilizations provided for each user playing a displayed player from the game server 2. What is done by the game server 2 is to provide the kind of services as the information for each game terminal 1, and this game terminal 1 makes the display mode according to the kind of the services.

Figure 4B:
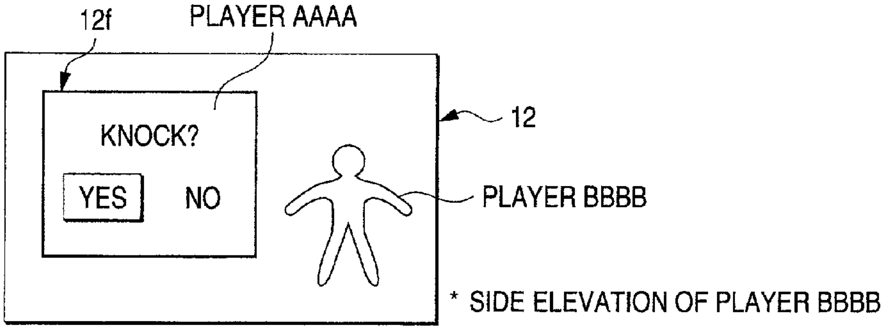

When displayed player BBBB approaches displayed player AAAA in the game space (as referred to FIG. 4A), the user playing a displayed player BBBB is automatically required, within a predetermined distance from displayed player AAAA, by the control of the game server 2 to make a confirmation on whether or not the user playing a displayed player BBBB knocks (as referred to FIG. 4B). Specifically, a knock deciding screen 12*f* appears in the display screen to request the user playing displayed player BBBB to select "Knock (Yes)" or "Not (No)" (as referred to FIG. 4B).

Figure 4C:
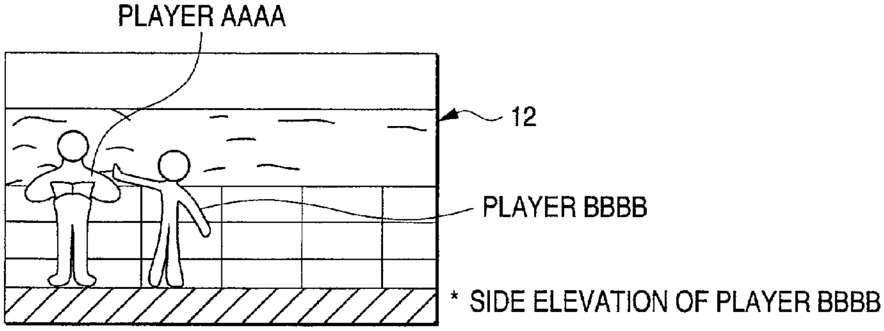
Figure 4D:
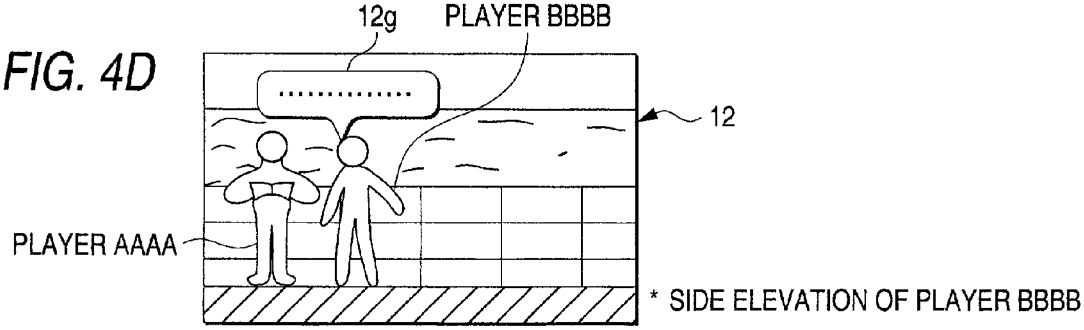

If "Yes" is selected (as referred to FIG. 4B), there is executed the display for the user playing displayed player BBBB to knock the user playing displayed player AAAA, as shown in FIG. 4C. If an answer to the knock is made by the user playing displayed player AAAA, the chatting function is started and a chat screen is prepared 12*g* (as referred to FIG. 4D). A message can be transmitted from the user playing displayed player BBBB to the user playing displayed player AAAA if inputted to the chat screen 12*g*. Naturally, the message can be received from the user playing displayed player AAAA by the chatting function.

With reference to FIGS. 5A to 5C, here will be described an answer made by the user playing displayed player AAAA to the knock of the user playing a displayed player BBBB. When the user playing displayed player BBBB knocks the user playing displayed player AAAA, as shown in FIG. 4B, a knock screen 12*h* is displayed by an interrupt in the display screen of the user playing displayed player AAAA (as referred to FIG. 5A).

In the knock screen 12*h*, there is displayed a question such as "Knocked by BBBB. Answer ?", so that the user playing displayed player AAAA can arbitrarily select "Answer" (Yes) or "No Answer" (No) (as referred to FIG. 5A).

If "Yes" is selected (as referred to FIG. 5A), the message 12*h* "Comics Being Saved" is displayed (as referred to FIG. 5B), so that the comics data are saved in the memory of the game terminal 1. The answer from the user playing displayed player AAAA to the knock is noticed through the game server 2 to the user playing a displayed player BBBB. Then, on the side of the user playing a displayed player BBBB, the chat function is started to prepare the chat screen 12*g* (as referred to FIG. 4D), as has been described hereinbefore. Likewise, on the side of the user playing displayed player AAAA, the chat function is started and the chat screen 12*g* is prepared (as referred to FIG. 5C).

The user playing displayed player AAAA is enabled by inputting a message to the chat screen to transmit the message to the user playing displayed player BBBB. Naturally, the user playing displayed player AAAA can receive a message from the user playing displayed player BBBB by the chatting function.

The description thus far made is in the environment where the displayed players can encounter each other, but there is another case in which displayed player AAAA and displayed player CCCC are moving on other maps. In the Table of FIG. 2, more specifically, displayed player AAAA is moving on Map No. 6 whereas displayed player CCCC has reached Map No. 7 prior to displayed player AAAA.

With reference to FIGS. 6A to 6C, here will be described the knocking action from the user playing displayed player CCCC to the user playing displayed player AAAA. In this state, the user playing displayed player AAAA is receiving the comics services, as shown in FIG. 4A, but the user playing displayed player CCCC is seeing the ship coming to the harbor, as shown in FIG. 6A.

At this time, it is assumed that neither another displayed player nor any event is around displayed player CCCC. It is further assumed that displayed player CCCC is scheduled to meet with displayed player AAAA at this harbor and to communicate with the user playing a displayed player AAAA by the knock function.

Therefore, the user playing a displayed player CCCC operates first to open the menu 12*h* and moves the cursor to select the "Knock" (as referred to FIG. 6B). There is no object to be knocked around displayed player CCCC so that the game server 2 transmits a user list from the identification information to the game terminal 1 of the user playing displayed player CCCC. This user list may select members in advance among the users and/or players, may be a member list of all the game participants or may be a member list of all the users capable of receiving the present services.

Here, it is assumed that the members are selected in advance. The members are assumed to be composed of four displayed players AAAA, BBBB, CCCC and DDDD. In the screen of the game terminal 1 of the user playing displayed player CCCC, therefore, there are displayed an inquiry "Whom Knock to", the identification information on the members, and the online utilizations of the individual members (as referred to FIG. 6C). The situation descriptions are: "On Board" for displayed player AAAA; "Reading Comics" for the user playing displayed player AAAA; "On Board" for displayed player BBBB; and "Not Participate in Game" for the user playing displayed player DDDD. For the user playing displayed player DDDD, there may be added the situation description of listening to a music, as listed in FIG. 2.

If the user playing displayed player AAAA is thus selected (as referred to FIG. 6C), the chatting function is activated by the knocking of the user playing displayed player AAAA by the user playing displayed player BBBB, but the communications are not held if the knocking is denied.

Although the foregoing description has been made on the comics services, there are other services such as the music services. As shown in FIG. 4A, the user playing displayed player AAAA receiving the comics services is switched to the display mode of taking the pose of reading comics. As shown in FIG. 7, the displayed player may be switched to the display mode of wearing a headphone, for example, when the music services are received.

Figure 8:
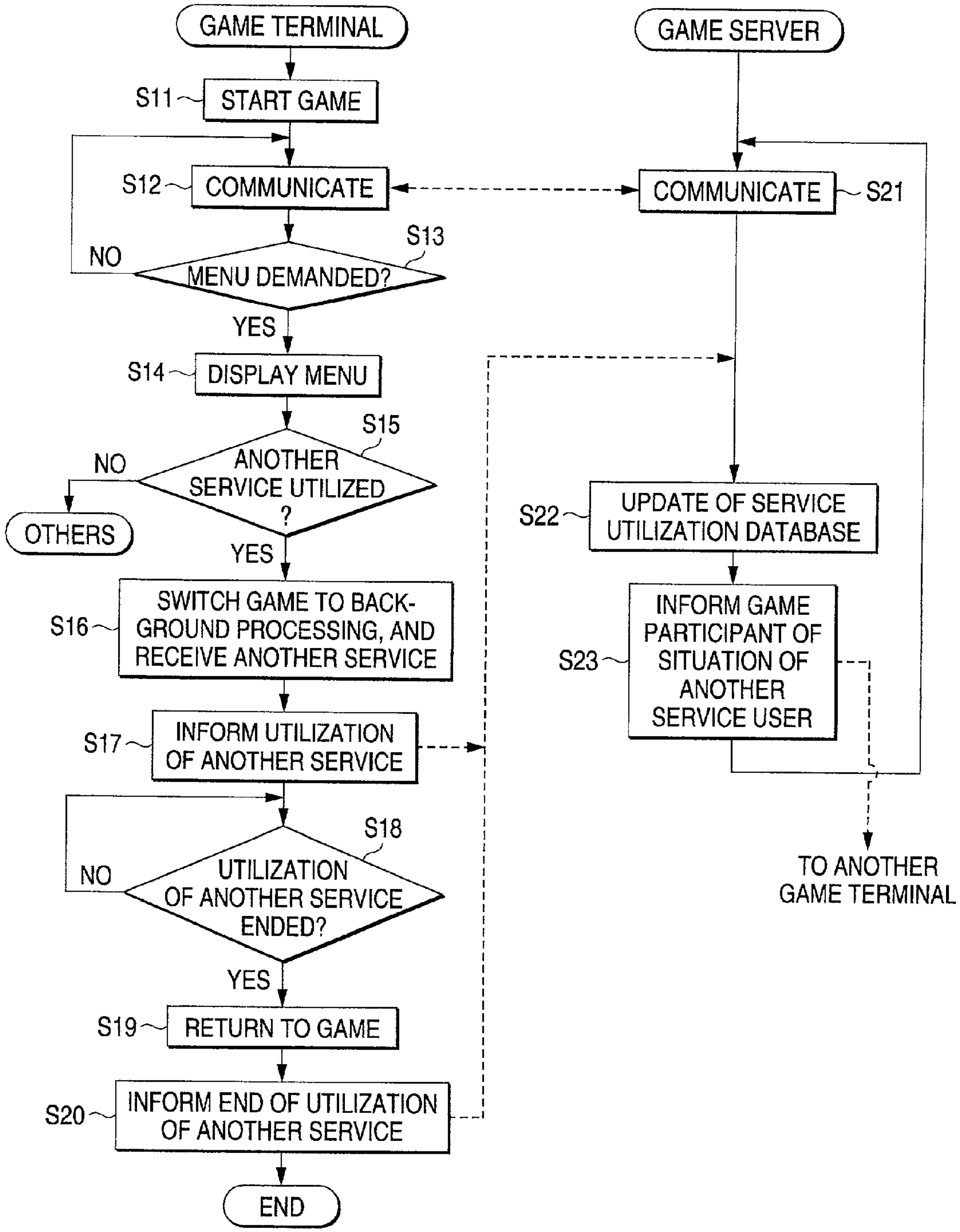
FIG. 8 is a flow chart for explaining operations on utilization of a plurality of services according to the disclosed embodiment.
Figure 9:
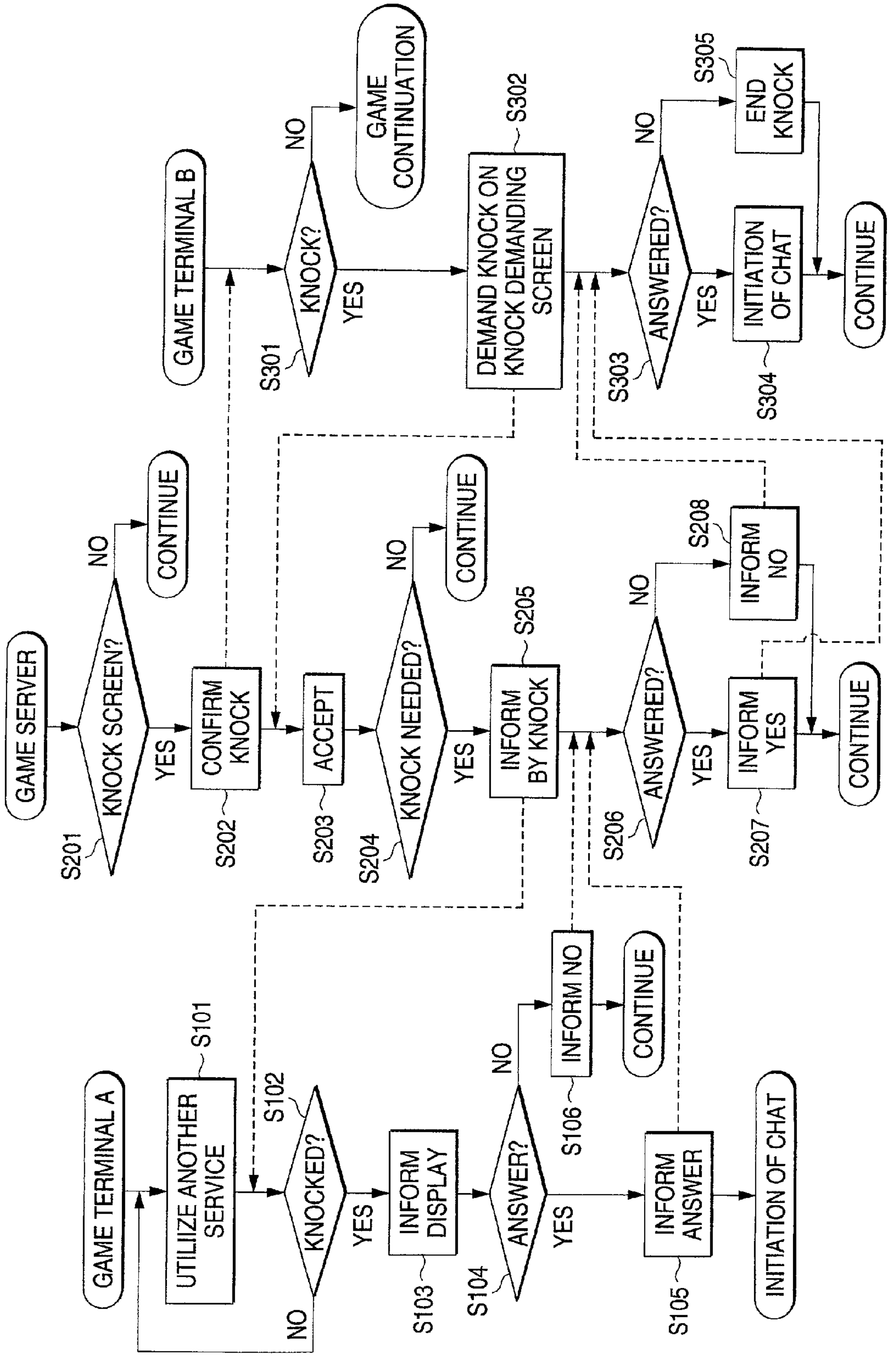
FIG. 9 is a flow chart for explaining operations on a knock function according to the disclosed embodiment.

Here will be described the operations of this embodiment. FIG. 8 is a flow chart for explaining the operations on the utilization of a plurality of services according to the embodiment, and FIG. 9 is a flow chart for explaining the operations on the knock function according to this embodiment.

First of all, the utilization of the plurality of services will be described with reference to FIG. 8. Here are exemplified the operations between the game terminal 1 and the game server 2. At first, the game is started (at Step S11) at the game terminal 1 after the not-shown user authentication, and an event or the like in the game is provided between the game terminal 1 and the game server 2 (at Step S12). After the start of the game, the event is provided from the game server 2 to the game terminal 1 (at Step S21).

While no demand is made for the menu during the game play at the game terminal 1 (on the No route of Step S13), the game scenario proceeds in response to the operation of the user. In this meanwhile, the communications with the game server 2 are continued (at Step S12). If the menu demand is made by the operation of the user (on the Yes route of Step S13), the menu of available services is displayed on the display screen (at Step S14: as referred to FIG. 3C).

If any service of comics, music, mail and chats is selected from the menu display by the operation of the user (on the Yes route of Step S15), the game program is switched to the background so as to receive the selected service. Then, this selected service can be received concurrently with the execution of the game (at Step S16). Here in the menu display of Step S14, there is another selection element such as the element of ending the game without selecting the services. If an instruction of another service utilization comes in, the other processes are executed (on the No route of Step S15).

When other services are provided at Step S16, the game server 2 is informed of the kinds of other services selected together with the identification information of the user playing a displayed player (at Step S17), and the other services are continued until the end of the utilization of those services (on the No route of Step S18).

When the other service utilization is ended by the operation of the user (on the Yes route of Step S18), the game program being processed on the background is returned to the main (at Step S19). After this, the game server 2 is informed of the notice of the end of the other service utilization (at Step S20). This notice of the end contains the identification information of the user playing a displayed player and the kind of the other service.

In the flow thus far described, if the game server 2 is informed of the kind of the other service at Step S17 on the side of the game terminal 1, other kinds of services are flagged in the game server 2 on the basis of the identification information from the notice reached. Thus, the contents of the service utilization database 21 are updated (at Step S22).

In accordance with this updating, the other displayed player, as positioned on the same map as that of the displayed player having started the service utilization, is informed of a notice requesting a change in the display mode according to the kind of the service. When the service utilization database 21 is updated, more specifically, that other user playing a displayed player is informed real time of the Map No. of the displayed player, the kind of the available services and so on (at Step S23).

Like the aforementioned database updating by using the new service utilization, the game server 2 executes the operations of Steps S22 and S23 when the user playing a displayed player ends the utilized service. At the game terminal 1, more specifically, if the end of the utilization of other services is informed at Step S20, the flag of the corresponding service is reset at the game server 2 so that the contents of the service utilization database 21 are updated (at Step S22). In addition, the relating user playing a displayed player is informed of the notice accompanying that database updating (at Step S23).

The knocking function will now be described with reference to FIG. 9. Here, it is premised that a game terminal A utilizes other services, and in this situation, a game terminal B uses the knocking function. In the foregoing example, the user playing displayed player AAAA is the user of the game terminal A, and the user playing displayed player BBBB is the user of the game terminal B. In connection with this example, here will be described the operations.

Game terminal A has already demanded other services and is receiving that service concurrently with the game (at Step S101). In this meanwhile, the knock from another user playing a displayed player is confirmed. Without any knock (on the No route of Step S102), it is continued to utilize those other service. Meanwhile, the game program is processed in the background.

In the game server 2, on the other hand, the distance between the displayed players is examined, and the utilization of the service is examined to decide where the knock screen is. Without this knock screen (on the No route of Step S201), the processing of the game server 2 is continuously executed.

When the knock screen appears, as shown in FIG. 4A, for example, it is decided (on the Yes route of Step S201). At this time, the knock is confirmed on the user playing displayed player BBBB having approached displayed player AAAA which is played by the user utilizing the service (at Step S202). If the game terminal B, i.e., the user playing displayed player BBBB knocks (on the Yes route of Step S301), the knock is officially demanded for the game server 2 (at Step S302). As described (as referred to FIG. 4B), more specifically, the user playing displayed player BBBB approves the knock by operating the knock screen **12*f*. If the operation to deny the knock is received at Step S301 (on the No route of Step S301**), the game is naturally continued as it is at the game terminal B.

After the knock is accepted (at Step S203), it is decided again at the game server 2 (on the Yes route of Step S204) whether or not the knock can be made, and the game terminal A, i.e., the user playing displayed player AAAA is informed of the knock (at Step S205). In this repeated confirmation, reference is made to the service utilization database 21.

Here, the game terminal B awaits, after having demanded the knock at Step S302, the answer from the game terminal A (or the user playing displayed player AAAA). If the answer is confirmed through the game server 2 (on the Yes route of Step S303), the chat is initiated (at Step S304). Through this chat, the user playing displayed player BBBB can communicate with the user playing displayed player AAAA in the game space. If the answer cannot be confirmed (on the No route of Step S303), on the other hand, the knock is ended (at Step S305), and the game is continued.

At game terminal A, if the knock notice comes in from the game server 2 so that the knock is confirmed (on the Yes route of Step S102), it is interruptedly displayed (at Step S103: as referred to FIG. 5A) whom the knock comes from. Therefore, the user playing displayed player AAAA recognizes the knock from the user playing displayed player BBBB. If affirmative, the answer is made (on the Yes route of Step S104), and its notice is transmitted to the game terminal B through the game server 2 (at Step S105). In this case, moreover, the chat is initiated so that the communications can be made with the user playing displayed player BBBB through the chat.

In the case of no answer, on the other hand, no answer is made (on the No route of Step S104), the game terminal B is informed of No answer through the game server 2 (at Step S106). In this case, the services are continuously received as they are.

The game server 2 transmits the answer to the game terminal B, when it confirms the answer from the game terminal A (on the Yes route of Step S206), and continues the processing as the game server. On the other hand, the game server 2 transmits the No answer to the game terminal B, when it confirms the No answer from the game terminal A (on the No route of Step S206), and continues the processing as the game server.

Figure 10:
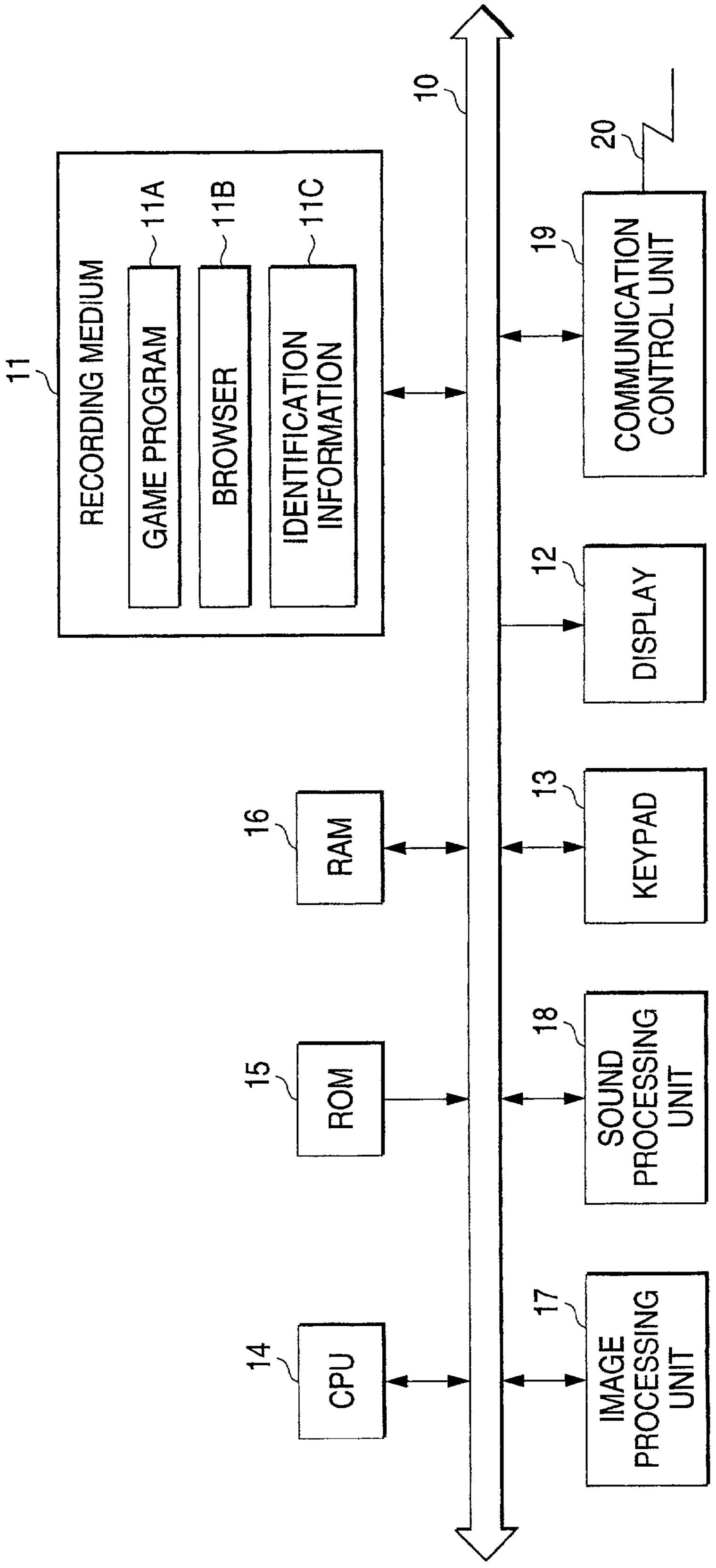
FIG. 10 is a block diagram showing one example of the construction of a game terminal according to the disclosed embodiment.

Here will be briefly described the construction of the game terminal 1. FIG. 10 is a block diagram showing one construction example of the game terminal 1 according to this embodiment. This game terminal 1 is constructed, as shown in FIG. 10, by connecting with an internal bus 10 a CPU 14, a ROM 15, a RAM 16, the recording medium 11, an image processing unit 17, a sound processing unit 18, the keypad 13, the display 12, a communication control unit 19 and so on.

The internal bus 10 is a line for transmitting the address signal or data in the system. The CPU 14 controls the operations of the game terminal itself as a whole according to the various programs recorded in the recording medium 11. The ROM 15 is stored with programs such as the push demanding program or the game program for activating the applications, a variety of parameters and so on.

The RAM 16 is a memory to be used as the work area at the time of executing the various programs. The recording medium 11 may be used, although already described, for storing new programs or data from the network through a line 20 connected with the communication control unit 19. The image processing unit 17 administers the game execution, the comics display and so on. The sound processing unit 18 administers the game execution, the music output and so on.

The keypad 13 is a unit for inputting the operations of the user. The display 12 is a unit for outputting the image and the sound. The communication control unit 19 is an interface connected with the network 7 via the line 20 for receiving the various services from the network 7. This communication control unit 19 is equipped therein with a modem, through which the connection with a provider is effected when connected with the network 7.

As has been described hereinbefore, according to this embodiment, even while the online game is being played, other services can be provided so that the time can be significantly utilized without any interruption of the game.

Where there is a user utilizing other services (e.g., the comics distributions or the music distributions) while playing an online game, on the other hand, another user can grasp it in the field of the game and determine what service the former user is receiving, and can be recognized by the former user playing a displayed player by making a knock in the world of the game.

Thus, communications with the user receiving the other services can be made in the online game space so that the online game can be effectively exploited as a portion of life as one of the communication means. In short, it is possible to provide the environment in closer contact with the life.

On the other hand, in the game world where the displayed player is moving (in an idle state) on a vehicle, such as a ship without any battle, a better reality can be obtained if the user playing a displayed player himself reads with the stream of time.

In this embodiment, on the other hand, the knock is informed in terms of sentences, but the user may also be enabled to recognize the knock by making a visual presence of marks or by an audio presence of sounds.

When the identification information identifying who has knocked is to be presented, on the other hand, it may be given by the handle name, the mail address or the screen name.

In this embodiment, on the other hand, the acceptance of the knock is denied, but it may be set to accept no knock in advance from any one. In this case, the denial may be administered by the service utilization database on the side of the game server 2.

The knock may be handled by the operation according to the decision of the user or may be canceled.

Where the game is restored in response to the knock while the comics are being read, on the other hand, it may be recorded that the comics have been read midway on the side of the game terminal 1. In this case, the reading may be restarted later from the remainder by the authentication or the like. If the comics are read offline by downloading them, they can be reopened later from the remainder. Specifically, all the data are downloaded from the comics server 3, and the display is changed by sequentially turning over the pages. Then, the comics can be read later from the remainder.

Where the game screen is shifted temporarily to another service screen so as to download the comics or music, on the other hand, it is restored again merely after the downloading operation. When the downloading of desired contents is ended while the game is continued, the user is enabled to recognize that end by presenting it (e.g., the end of the download) visually in the mark or the like on the game screen or aurally by generating the sound.

On the other hand, the invention should not be limited to the knock by another user but may be exemplified by a knock for making the event recognized in the game. Specifically, the knocking function of the event is beneficial for the case in which a monster appears (or the displayed player is confronted with a danger) when the ship arrives at the destination in this embodiment, so that the displayed player can be prevented from being unconsciously thrown down.

Here in this embodiment, the contents are exemplified by the comics or music. However, the invention should not be limited thereto but may be exemplified by movies or TV programs.

As has been described hereinbefore, according to the invention, even while the online game is being played, other services can be provided so that the time can be significantly utilized without any interruption of the game.

According to the invention, where there is a user playing a displayed player utilizing other services (e.g., the comics distributions or the music distributions) while playing an online game, on the other hand, another user can grasp it in the field of the game and determine what service the former user playing a displayed player is receiving, and can be recognized by the former user playing a displayed player by making a knock in the world of the game.

Thus, communications with the user receiving the other services can be made in the online game space so that the online game can be effectively exploited as a portion of life as one of the communication means. In short, it is possible to provide the environment in closer contact with the life.

What is claimed is:

1. An online-composite servicing method for controlling communications between a game server and at least one game terminal through a network, comprising:

assigning, under control of said game server, identification information individually to each game terminal and administering game space positional information of a displayed player of each game terminal participating in a game;

discriminating, under control of said game server, users of each game terminal participating in the game that is receiving at least one other service concurrently through the network from a server, the at least one other service including one of entertainment data, musical data, comics data, and chat communication;

adding, under control of said game server, information specifying said at least one other service to the game space positional information of a discriminated displayed player corresponding to each discriminated game terminal; and feeding, under control of said game server, each game terminal participating in the game with said administered game space positional information of the displayed player of each game terminal and the information specifying said at least one other service;

displaying, under control of said at least one game terminal, a service utilization of another user based on the game space positional information of another displayed player, as fed from said game server, and the information specifying the at least one other service;

accepting, under control of said at least one game terminal, a demand for the at least one other service in response to a first operation of the user participating in the game; and receiving, under control of said at least one game terminal, said at least one other service through said network while executing the game in a background, and informing said game server of the at least one other service being received.

2. An online-composite servicing method according to claim 1, further comprising:

accepting, under control of said at least one game terminal, identification information specifying the other displayed player in response to a second operation of the user when a knock is made in a game space to the other displayed player, and transmitting said accepted identification information and the identification information of an own game terminal as the identification information of a knocked game terminal and the identification information of a knocking game terminal to said game server, respectively, for demanding the knock, and knocking, under control of said game server, to said knocked game terminal, when said knock demand is received, and providing the identification information of said knocking game terminal.

3. An online-composite servicing method according to claim 2, further comprising:

controlling, under control of said game server, a message exchange between said knocked game terminal and said knocking game terminal when said knocked game terminal answers the knock.

4. An online-composite servicing method according to claim 2, further comprising:

controlling, under control of said game server, chat communications between said knocked game terminal and said knocking game terminal when said knocked game terminal answers the knock.

5. An online-composite servicing method according to claim 1, further comprising:

receiving, under control of said at least one game terminal, a feed of the musical data as the at least one other service.

6. An online-composite servicing method according to claim 5, further comprising:

changing, under the control of said at least one game terminal, the other displayed player into a display mode listening to music in a game space when it is confirmed from said information specifying the at least one other service that the other user is receiving the musical data.

7. An online-composite servicing method according to claim 1, further comprising:

receiving, under control of said at least one game terminal, a feed of the comics data as the at least one other service.

8. An online-composite servicing method according to claim 7, further comprising:

displaying, under control of said at least one game terminal, the other displayed player into a display mode reading comics in a game space when it is confirmed from said information specifying the at least one other service that the other user is receiving the comics data.

9. An online-composite servicing method according to claim 2, further comprising:

detecting, under control of the game server, if the distance between the displayed player and the other displayed player is within a predetermined range to initiate the knock; and requiring, under control of the game server, the user to confirm a desire to knock.

10. A computer-readable recording medium storing a program for realizing a method for controlling communications between a game server and at least one game terminal through a network, wherein said program comprises:

assigning, under control of said game server, identification information individually to each game terminal and to administer game space positional information of a displayed player of each said game terminal participating in a game;

discriminating, under the control of said game server, users of each game terminal participating in the game that is receiving at least one other service concurrently through the network from a server, the at least one other service including one of entertainment data, musical data, comics data, and chat communication;

adding, under control of said game server, information specifying said at least one other service to the game space positional information of a discriminated displayed player corresponding to each discriminated game terminal; and feeding, under control of said game server, each game terminal participating in the game with said administered game space positional information of the displayed player of each game terminal and the information specifying said at least one other service;

displaying, under control of said at least one game terminal, a service utilization of another user based on the game space positional information of another displayed player, as fed from said game server, and the information specifying the at least one other service;

accepting, under control of said at least one game terminal, a demand for the at least one other service in response to a first operation of the user participating in the game; and receiving, under control of said at least one game terminal, said at least one other service through said network while executing the game in the background, and informing said game server that said at least one other service is being received.

11. A recording medium according to claim 10, wherein said program further comprises:

accepting, under control of said at least one game terminal, identification information specifying the other displayed player in response to a second operation of the user when a knock is made in a game space to the other displayed player, and to transmit said accepted identification information and the identification information of an own game terminal as the identification information of a knocked game terminal and the identification information of a knocking game terminal to said game server, respectively, for demanding the knock; and knocking, under control of said game server, to said knocked game terminal, when said knock demand is received, and providing the identification information of said knocking game terminal.

12. A recording medium according to claim 9, wherein said program further comprises:

controlling, under control of said game server, a message exchange between said knocked game terminal and said knocking game terminal when said knocked game terminal answers the knock.

13. A recording medium according to claim 9, wherein said program further comprises:

controlling, under control of said game server, chat communication between said knocked game terminal and said knocking game terminal when said knocked game terminal answers the knock.

14. A recording medium according to claim 11, wherein said program further comprises:

detecting, under control of said game server, if the distance between the displayed player and the other displayed player is within a predetermined range to initiate the knock; and requiring, under control of said gamer server, the user to confirm a desire to knock.

15. A recording medium according to claim 10, wherein said program further comprises:

receiving, under control of said at least one game terminal, a feed of the musical data as the at least one other service.

16. A recording medium according to claim 15, wherein said program further comprises:

changing, under control of said at least one game terminal, the other displayed player into a display mode listening to music in a game space when it is confirmed from said information specifying the at least one other service that the other user is receiving the musical data.

17. A recording medium according to claim 10, wherein said program further comprises:

receiving, under control of said at least one game terminal, a feed of the comics data as the at least one other service.

18. A recording medium according to claim 17, wherein said program further comprises:

changing, under control of said at least one game terminal, the other displayed player into a display mode reading comics in a game space when it is confirmed from said information specifying the at least one other service that the other user is receiving the comics data.

19. An online-composite servicing system for controlling communications between a game server and at least one game terminal through a network, wherein the game server comprises:

an administrator that assigns identification information individually to each game terminal and that administers game space positional information of a displayed player of each game terminal participating in a game;

a discriminator that discriminates users of each game terminal participating in the game that is receiving at least one other service concurrently through the network from a server, the at least one other service including one of entertainment data, musical data, comics data, and chat communication;

an adder that adds information specifying the at least one other service to the game space positional information of a discriminated displayed player corresponding to each discriminated game terminal to the administrator; and a feeder that feeds each game terminal participating in the game with the administered game space positional information of the displayed player of each game terminal and the information specifying the at least one other service, and wherein the at least one game terminal comprises:

a display that displays a service utilization of another user based on the game space positional information of the other displayed player, as fed by the feeder from the game server, and the information specifying the at least one other service;

an acceptor that accepts a demand for the at least one other service in response to a first operation of the user participating in the game; and a composite servicer that receives the at least one other service through the network while executing the game in a background, and for informing the game server that the at least one other service is being received.

20. An online-composite servicing system according to claim 19, wherein the acceptor further comprises:

identification information specifying the other displayed player in response to a second operation of the user when a knock is made in a game space to the other displayed player, and for transmitting the accepted identification information and the identification information of an own game terminal as the identification information of a knocked game terminal and the identification information of a knocking game terminal to the game server, respectively, for demanding the knock, and wherein the game server further comprises:

a knocker that makes a knock to the knocked game terminal, when the knock demand is received, and for providing the identification information of the knocking game terminal.

21. An online-composite servicing system according to claim 20, wherein the game server further comprises:

a controller that controls a message exchange between the knocked game terminal and the knocking game terminal when the knocked game terminal answers the knock.

22. An online-composite servicing system according to claim 20, wherein the game server further comprises:

a controller that controls a chat communications between the knocked game terminal and the knocking game terminal when the knocked game terminal answers the knock.

23. An online-composite servicing system according to claim 20, wherein the game server further comprises:

said knocker initiating said knock when the distance between the displayed player and the other displayed player is within a predetermined range; and said acceptor further requiring the user to confirm a desire to knock.

24. An online-composite servicing system according to claim 19, wherein the at least one game terminal further comprises:

a receiver that receives the musical data as the at least one other service.

25. An online-composite servicing system according to claim 24, wherein the at least one game terminal further comprises:

a changer that changes the other displayed player to a display mode listening to music in a game space when it is confirmed, by the information specifying the at least one other service, that the other user is receiving the musical data.

26. An online-composite servicing system according to claim 19, wherein the at least one game terminal further comprises:

a receiver that receives the comics data as the at least one other service.

27. An online-composite servicing system according to claim 26, wherein the at least one game terminal further comprises:

a changer that changes the other displayed player into a display mode reading comics in a game space when it is confirmed, by the information specifying the at least one other service, that the other user is receiving the comics data.

* * * * *